United States Patent
Smith

(10) Patent No.: US 8,794,203 B2
(45) Date of Patent: Aug. 5, 2014

(54) VALVE COVER WITH DECOUPLED NVH ISOLATION AND SEALING FEATURES

(75) Inventor: Thomas Edward Smith, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1146 days.

(21) Appl. No.: 12/265,460

(22) Filed: Nov. 5, 2008

(65) Prior Publication Data

US 2010/0109258 A1    May 6, 2010

(51) Int. Cl.
 *F01M 9/10* (2006.01)
(52) U.S. Cl.
 USPC ............... 123/90.38; 123/90.37; 123/198 E
(58) Field of Classification Search
 USPC ............... 123/90.38; 277/634–636
 See application file for complete search history.

(56) References Cited

U.S. PATENT DOCUMENTS

| | | | | |
|---|---|---|---|---|
| 4,499,869 A * | 2/1985 | Visek | | 123/195 C |
| 4,506,768 A * | 3/1985 | Innocent | | 188/370 |
| 4,522,165 A | 6/1985 | Ogawa | | |
| 4,718,680 A * | 1/1988 | Halconruy et al. | | 277/346 |
| 5,368,797 A | 11/1994 | Quentin et al. | | |
| 5,513,603 A | 5/1996 | Ang et al. | | |
| 5,516,123 A * | 5/1996 | Eckel | | 277/637 |
| 5,899,463 A * | 5/1999 | Koch | | 277/634 |
| 6,591,801 B1 * | 7/2003 | Fonville | | 123/90.38 |
| 6,691,667 B2 | 2/2004 | Salameh | | |
| 6,994,354 B2 * | 2/2006 | Sakata | | 277/598 |
| 7,204,218 B2 | 4/2007 | Vom Stein | | |
| 7,631,630 B2 * | 12/2009 | Sedlar et al. | | 123/195 C |
| 7,789,005 B2 * | 9/2010 | Rejai | | 83/862 |
| 7,789,055 B2 * | 9/2010 | vom Stein | | 123/90.37 |
| 7,827,950 B2 * | 11/2010 | Hu et al. | | 123/90.38 |
| 7,934,480 B2 * | 5/2011 | Katayama et al. | | 123/90.37 |
| 8,100,486 B2 * | 1/2012 | Veltrop | | 312/296 |
| 8,141,531 B2 * | 3/2012 | Smith et al. | | 123/90.38 |
| 2004/0232626 A1 * | 11/2004 | Sakata et al. | | 277/602 |
| 2007/0012271 A1 * | 1/2007 | Hilpert | | 123/90.38 |
| 2007/0017282 A1 * | 1/2007 | Tooyama et al. | | 73/118.1 |
| 2008/0036159 A1 * | 2/2008 | Yanagi | | 277/594 |
| 2009/0044773 A1 * | 2/2009 | Hu et al. | | 123/90.38 |
| 2009/0045592 A1 * | 2/2009 | Hurlbert et al. | | 277/628 |
| 2009/0166987 A1 * | 7/2009 | Shibata | | 277/636 |
| 2010/0270745 A1 * | 10/2010 | Hurlbert et al. | | 277/312 |

* cited by examiner

*Primary Examiner* — Thomas Denion
*Assistant Examiner* — Steven D Shipe
(74) *Attorney, Agent, or Firm* — James Dottavio; Alleman Hall McCoy Russell & Tuttle LLP

(57) ABSTRACT

A cylinder head cover, and a gasket are disclosed for sealing a cylinder head and isolating cylinder head vibrations from a cylinder head cover body. An example cylinder head cover may include a gasket having an elongate first gasket part and a flexible second gasket part sealingly coupled with the first gasket part along a length of the first gasket part. A bottom carrier may be configured to hold the first gasket part against a cylinder head for sealing engagement with the cylinder head. In addition a cover body may be configured to provide a covering surface sealingly coupled with the second gasket part at a spaced apart distance from the cylinder head.

13 Claims, 3 Drawing Sheets

VALVE COVER WITH DECOUPLED NVH ISOLATION AND SEALING FEATURES

BACKGROUND/SUMMARY

Many gasoline and diesel cylinder head covers are isolated systems. The covers may be balanced between elastomeric isolator grommets and an elastomeric perimeter gasket. One approach to improve sealing capability is to increase the overall stiffness of the isolation system. However, increasing stiffness of the isolation system may increase Noise Vibration and Harshness (NVH) of the engine and/or cylinder head cover. Conversely, decreasing stiffness of the isolation system may increase the risk of oil leaks.

As one example compromise between sealing and stiffness, U.S. Pat. No. 6,691,667 to Salemeh discloses a casing cover having an acoustically decoupled stop. The casing cover has an axial extension having a peripheral edge profiled to receive a profiled elastomer seal having an edge surface for engaging a sealing surface of the engine block.

However, the inventors herein have recognized several issues with such an approach. As one example, the approach requires that a tension be maintained between the axial extension of the casing cover, and the engine block, compressing the profiled seal. This approach still allows a substantial avenue for NVH to be transmitted from the engine block to the casing.

Thus, in one example, the above issues may be addressed by a cylinder head cover for an internal combustion engine wherein the sealing function and the NVH isolation function may be decoupled from one another. The cylinder head cover may include a gasket having an elongate first gasket part and a flexible second gasket part sealingly coupled with the first gasket part along a length of the first gasket part. A bottom carrier may be configured to hold the first gasket part against a cylinder head for sealing engagement with the cylinder head. In addition a cover body may be configured to provide a covering surface sealingly coupled with the second gasket part at a spaced apart distance from the cylinder head.

The first gasket part may serve to seal the cylinder head cover at a juncture between the cylinder head and the bottom carrier. By coupling the cover body to a the second gasket part a distance from the first gasket part, the sealing function and the NVH isolation function may be separated, and may be individually optimized. In this way an efficient, and cost effective, structure may be provided.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF DRAWINGS

FIGS. 3-5 are drawn approximately to scale. Other embodiments within the scope of this disclosure, but not illustrated, may have other relative sizes.

DETAILED DESCRIPTION

A valve cover for an internal combustion engine is described having spaced apart and/or separate sealing and NVH isolation functions. In this way each of the functions may be optimized.

In various embodiments, the perimeter of the cylinder head cover may be hard mounted to the cylinder head. This may enable a sealing gasket to be hard mounted onto the cylinder head. This may provide improved sealing performance. The improved sealing performance may also enable larger fastener spans, and therefore fewer fasteners to be used.

In various embodiments the NVH isolation may be moved relative to the sealing function. This may enable the NVH isolation to be optimized, and therefore improved NVH performance. Embodiments may enable elimination of the elastomeric grommet, and the isolator sleeve that may be otherwise be required. In some examples the NVH isolation may be moved inboard relative to a perimeter of the cylinder head cover.

Figure 1:
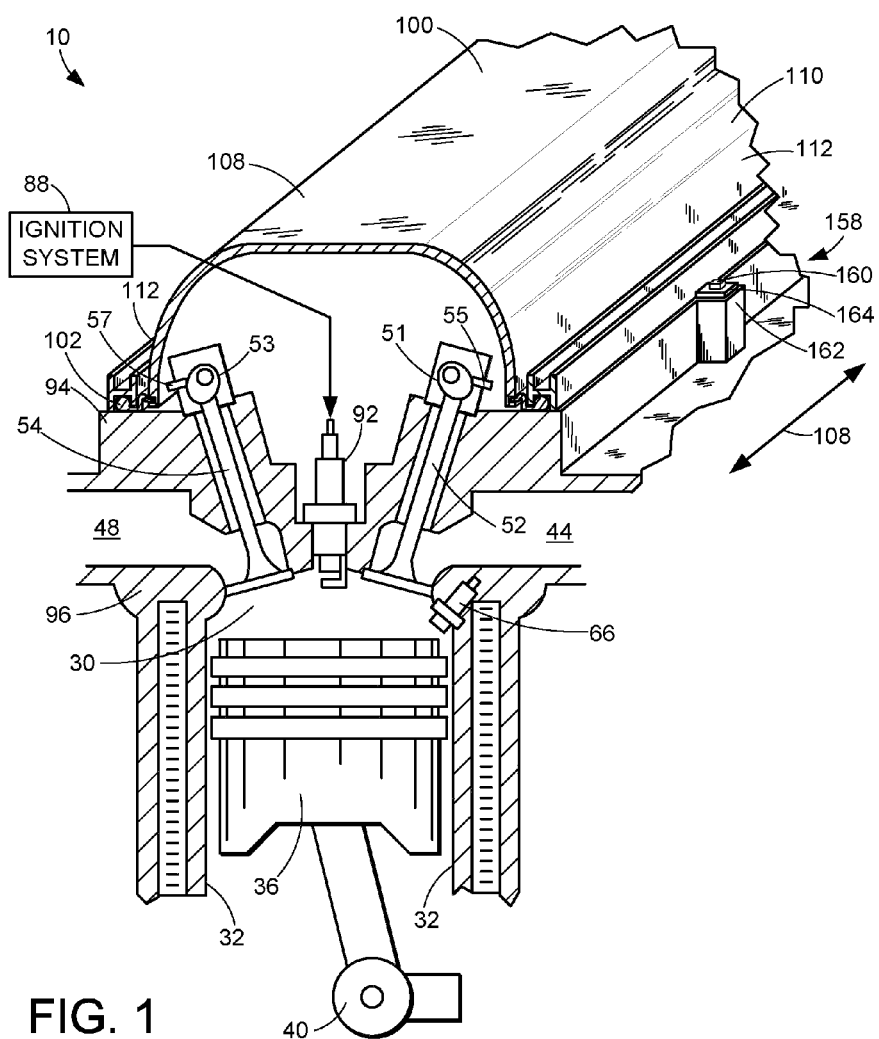
FIG. 1 shows a combination cross-sectional and isometric depiction of one cylinder in an internal combustion engine configured to propel a vehicle, with an example cylinder head cover configured in accordance with various embodiments.

Referring now to FIG. 1, it shows a combination cross sectional and isometric diagram. FIG. 1 shows one cylinder of multi-cylinder engine 10, which may be included in a propulsion system of a vehicle. Engine 10 may be controlled at least partially by a control system that may include a controller (not shown), and by input from a vehicle operator via an input device such as an accelerator pedal. Combustion chamber (i.e. cylinder) 30 of engine 10 may include combustion chamber walls 32 with piston 36 positioned therein. Piston 36 may be coupled to crankshaft 40 so that reciprocating motion of the piston 36 is translated into rotational motion of the crankshaft 40. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from an intake manifold 44, and may exhaust combustion gases via exhaust passage 48. Intake manifold 44 and exhaust passage 48 may selectively communicate with combustion chamber 30 via respective intake valve 52 and exhaust valve 54. In some embodiments, combustion chamber 30 may include one or more intake valves and/or one or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by the controller to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to a pulse width of a signal that may be received from the controller. In this manner, fuel injector 66 provides what is known as direct injection of fuel into combustion chamber 30. The fuel injector 66 may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Ignition system 88 may provide an ignition spark to combustion chamber 30 via spark plug 92 in response to a spark advance signal SA from the controller, under select operating modes. Though spark ignition components are shown, in some embodiments, combustion chamber 30 or one or more other combustion chambers of engine 10 may be operated in a compression ignition mode, with or without an ignition spark.

Cylinder head 94 may be coupled to a cylinder block 96. The cylinder head 94 may be configured to operatively house, and/or support, the intake valve(s) 52, the exhaust valve(s) 54, and the associated valve actuation systems 51 and 53 and the position sensors 55 and 57, and the like. Other components, such as spark plug 92 may also be housed and/or supported by the cylinder head 94. The cylinder block 96 may be configured to house the piston 36.

As described above, FIG. 1 shows only one cylinder of a multi-cylinder engine, and that each cylinder may similarly include its own set of intake/exhaust valves, fuel injector, spark plug, etc. Engine 10 as illustrated and described herein may be included in a vehicle such as a road automobile, among other types of vehicles. In some examples, engine 10 may be included as a portion of a hybrid propulsion system including one or more other motors or engines, such as in the case of a hybrid electric vehicle (HEV). While the example applications of engine 10 will be described with reference to a vehicle, it should be appreciated that engine 10 may be used in other applications not necessarily confined to vehicle propulsion systems.

Figure 2:
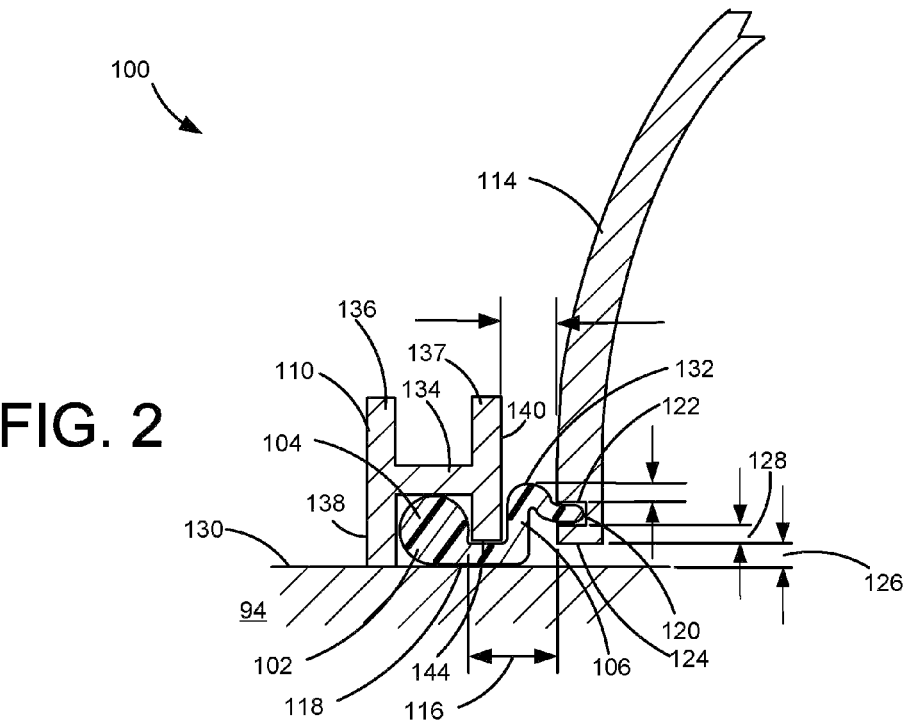
FIG. 2 shows a detailed cross-sectional depiction of the cylinder head cover shown in FIG. 1.

FIG. 1 also shows a cylinder head cover 100 for the internal combustion engine 10, and FIG. 2 shows a blowup view of a portion of the cylinder head cover 100. Example relative sizing is shown in FIG. 2, which is drawn approximately to scale. The cylinder head cover 100 may include a gasket 102 having an elongate first gasket part 104, and a flexible second gasket part 106 sealingly coupled with the first gasket part 104 along a length 108 of the first gasket part 104. A bottom carrier 110 may be configured to hold the first gasket part 104 against a cylinder head 94 for sealing engagement with the cylinder head 94. A cover body 114 may be configured to provide a covering surface of the cylinder head 94. The cover body 114 may be sealingly coupled with the second gasket part 106 at a spaced apart distance 116 from the cylinder head 94. In various embodiments the cover body 114 may be made from a thermoplastic.

Either or both of the first and second gasket part 104, 106 may be made from an elastomeric material. The first gasket part 104 may form an endless loop on a top surface 130 of the cylinder head 94.

The second gasket part 106 may have a first longitudinal edge 118 that may be attached longitudinally to the first gasket part 104. The second gasket part 106 may also have a second longitudinal edge 120 that may be substantially parallel with, and spaced from the first longitudinal edge 118. Although the first and second longitudinal edges 118, 120 may be parallel, they may be disposed at different distances from the cylinder head 94. The second gasket part 106 may form an elongate diaphragm between the first longitudinal edge 118, and the second longitudinal edge 120.

The second gasket second part 106 may be attached to the first gasket part 104 using various attachment mechanisms. For example, by using adhesives, welding, using fasteners, and the like. In some examples the second gasket part 106 may be integrally formed with the first gasket part 104. The gasket 102 may be, for example, a single molded elastomeric part. In some examples, the first gasket part 104 may have a circular cross section. The second gasket part 106 may be attached to first gasket part 104 radially, or tangentially, or by other suitable coupling configurations.

The second gasket second part 106 may be attached to the cover body 114 using various attachment mechanisms. For example, by using adhesives, welding, using fasteners, and the like. In various examples the cover body 114 may include a notch 122 configured to receive the second longitudinal edge 120. The second longitudinal edge 120 may be press fit into the notch 122 and/or attached using any of the attachment mechanisms described, or other suitable mechanism. The cover body 114 may have a perimeter edge 124 held a distance 126 above a top surface 130 of the cylinder head 94. The perimeter edge 124 may be spaced a distance 128 from the notch 122. In some examples the second longitudinal edge 120 may be attached directly to the perimeter edge 124.

The cover body 114 may be able to move relative to the cylinder head 94 and any movement thereof may be absorbed by the second gasket part 106. In this way the NVH from the cylinder head 94 may be effectively absorbed. The second gasket part 106 may include a curved portion 132 that may be configured to flex to absorb movement of the cover body 114 in a direction normal to the top surface 130 of the cylinder head 94, and also configured to absorb movement parallel with the top surface 130 of the cylinder head 94.

FIG. 1 also illustrates one of two or more fastener arrangements 158 that may be configured to secure the cylinder head cover 100 to the cylinder head 94. Fastener arrangement 158 may include a fastener 160, for example a bolt or a screw or the like, coupled with an attachment mount 162 which may be coupled with the cylinder head 94. The fastener 160 may pass through a mounting flange 164 coupled with, fastened to, or made integral with, the bottom carrier 110. The stiffening structure made possible by separating the sealing function from the NHV isolation function, of the present disclosure, may enable an efficient sealing function that may then enable the fastener arrangements 158 to be spaced relatively far apart. In this way fewer fasteners 160 may be used.

The cylinder head cover 100 may be configured to include various example configurations of the bottom carrier 110. For example, the bottom carrier shown in FIGS. 1 and 2 may include a flange 134 disposed substantially horizontally over the first gasket part 104. A first web 136 and a second web 137 may be connected to the flange 134, and may be disposed substantially vertically along opposite sides of the flange 134. The bottom carrier 110 may be configured to couple with, and/or to partially house the first gasket part 104. In some examples the gasket first part 104 may be located substantially between the webs 136, 137, and below the flange 134. In this example, the webs 136, 137 may protrude above the flange 134. The webs 136, 137 in particular the portion of the webs 136, 137 extending above the flange 134, may provide additional strength and rigidity to the bottom carrier 110. The additional increased strength and rigidity may also allow for using still fewer fasteners 160, i.e. a still greater fastener 160 spacing.

In this example, the first web 136 may be located on an outboard side 138 of the first gasket part 104, and the second web 137 may be located on an inboard side 140 of the first gasket part 104. The second web 137 may include a bottom edge 144 disposed to contact the second gasket part 106. In other examples, a space may exist between the bottom edge 144, and the second gasket part 106.

Figure 3:
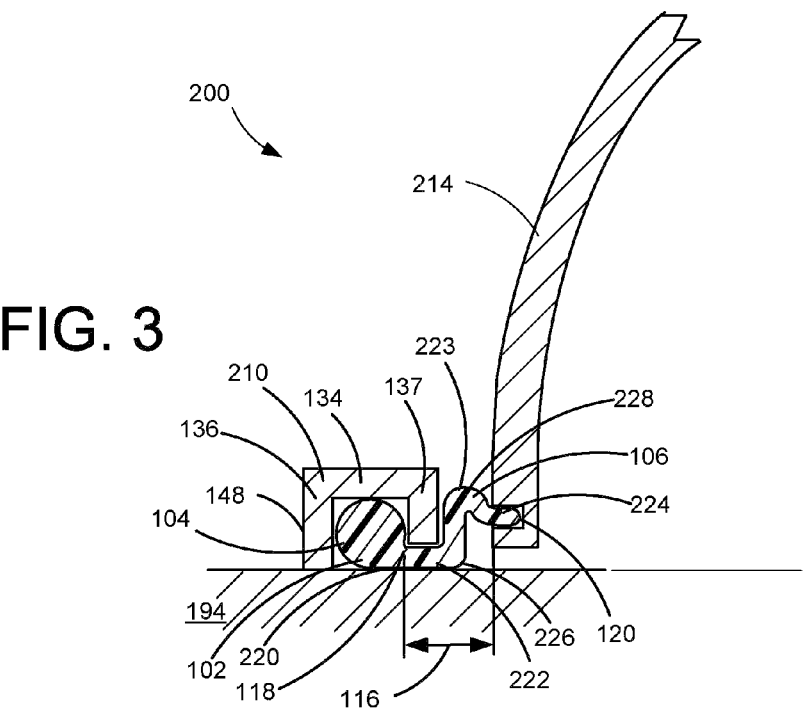
FIGS. 3-5 are detailed cross-sectional depictions of various gasket arrangements that may be used in other example cylinder head covers.

FIG. 3 is a cross sectional view of another example cylinder head cover 200. A gasket 102 may include an elongate elastomeric first gasket part 104 having a substantially circular cross section and may be configured to be fitted between a first element 194, and a second element 210 to seal a junction 220 between the first element 194 and second element 210. The gasket 102 may also include a flexible diaphragmatic second part 106 sealingly coupled at a first edge 118 thereof with the first part, and having a second edge 120 extending away from the first edge 118 and configured for sealing engagement with a third element 214 and configured to sealingly couple the third element 214 to the first and second elements 194, 210 in a flexible manner.

In this example the first element 194 may be a cylinder head 94, and the second element 210 may be a bottom carrier 110 configured to be fastened to the cylinder head 94. In addition the third element 214 may be a cylinder head cover body 114. The gasket 102 may be use in other applications instead of, or in addition to, with a cylinder head cover. One example use may be with an oil pan.

The example illustrated in FIG. 3 includes a first web 136 and a second web 137 connected to opposite edges of a flange 134. This example differs from the example illustrated in FIG. 2 at least in that the webs 136 and 137 do not extend above beyond the flange 134.

As may also be the case with earlier described examples, the gasket 102 shown in FIG. 3 may include a second gasket part 106 that may include a first portion 222 positioned to extend away from the first gasket part 104 adjacent the first element 194, and a second portion 223 positioned in a curved shape, and a third portion 224 connected to the third element 214 at a distance 116 from the first element 194. The second portion may have at least a first curve 226 and a second curve 228 such that any motion of the third element 214 relative to the first or second elements 212, 210 may be taken up by a flexing of one or both of the first curve 226 and the second curve 228 in the second portion 222.

Some example embodiments may include a gasket 102 including an elongate first part 104 and a diaphragmatic second part 106 wherein the first part 104 may be configured to provide a sealing engagement at a junction 220 between a first element 194 and a second element 210. The second part 106 may be configured to provide a flexible and sealing connection between a third element 214 and one or both of the first and second elements 194, 210.

The first part 104 and the second part 106 may form an endless loop and may be sized and shaped to substantially follow respective perimeters of the second element 210 and the third element 214.

Figure 4:
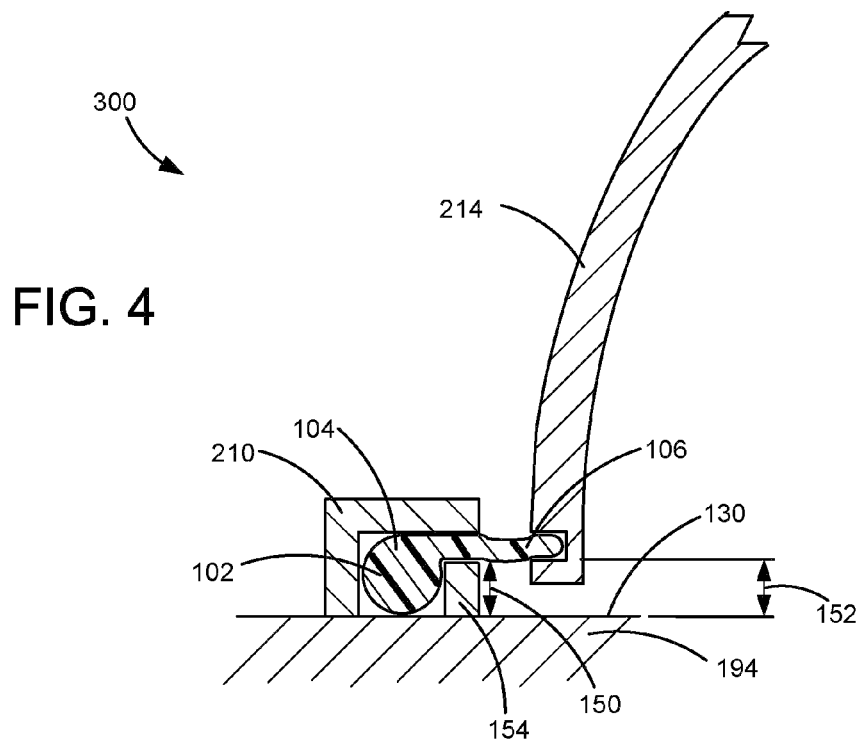

FIG. 4 illustrates another example cylinder head cover 300. In this example, a gasket 102 may have a second part 106 that extends from the first part 104 at a first spaced apart distance 150 from the first element 194. The first part 104 may be coupled with the third element 214 at a second spaced apart distance 152 from the first element 194. In some examples the first distance 150 may be substantially equal to the second distance 152. The third element 214 may be able to move relative to the first 194 and second elements 210, and any movement thereof may absorbed by the second part 106. The second part 106 may be a diaphragmatic second part 106.

The cylinder head cover 300 may include a standoff 154 configured to support part of the second gasket part 106 the first spaced apart distance 150 from the top surface 130 of the first element 194. The standoff may be attached to the first element 194, and/or to the bottom carrier 110.

Figure 5:
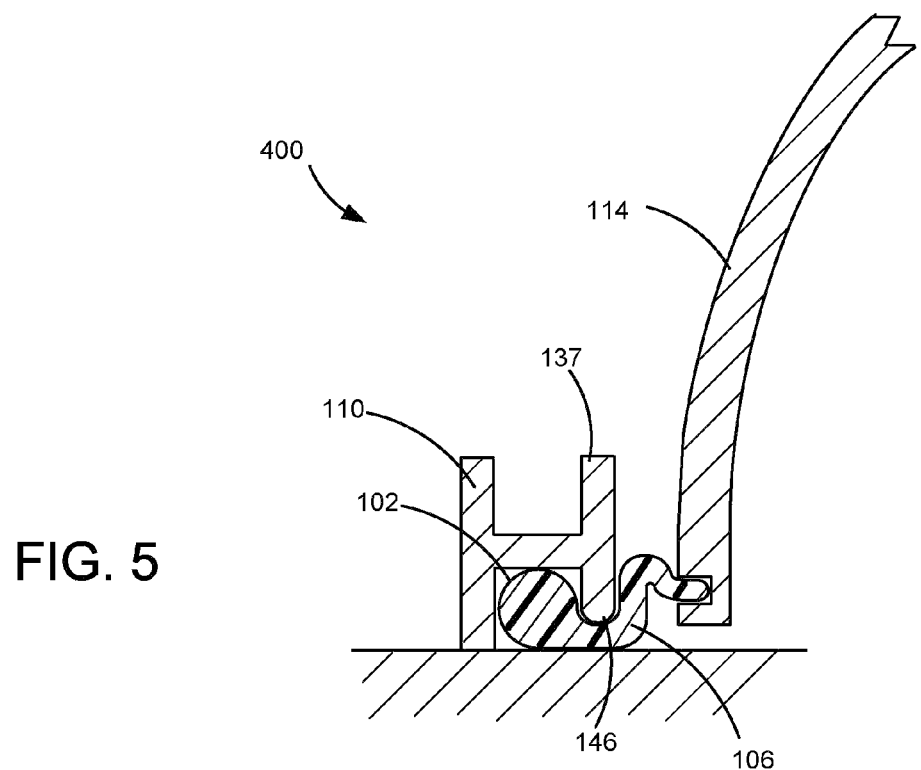

FIG. 5 illustrates another example cylinder head cover 400 including a gasket 102. In this example, the bottom carrier 110 may include a web 137. The web 137 may have a curved contact surface 146 configured to contact the second gasket part 106. In this way, the web 137 may exert a distributed pressure on the second gasket part 106. Also in this way, the second gasket part 106 may be allowed to flex in smooth manner upon any movement of the cover body 114.

A combination of the bottom carrier 110, the second gasket part 106, and the cover body 114 may form a substantially continuous seal over the cylinder head 94. The second gasket part 106 may provide at least some vibration isolation between the bottom carrier 110, and the cover body 114 at a spaced apart distance 120 from the bottom carrier 110. In this way the sealing features, for example clamping the bottom carrier 110 onto the first gasket part 104 may be made as stiff as may be necessary to provide effective sealing properties, and the isolation features, for example the second gasket part 106 may be made as soft as may be necessary to provide effective NVH isolation properties.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A valve cover for an engine, comprising:
 a valve-cover body spaced above a cylinder head of the engine;
 a valve cover gasket having a rounded, elongate first part to seal against the cylinder head, and a diaphragmatic second part received in a notch of the valve-cover body, the notch and the first part having substantially the same elevation relative to the cylinder head, the second part extending from the first part, toward the notch, in a direction consistently inboard the engine, the second part including a soft, flexible slack region to dampen noise from below the valve cover, the slack region statically curving up and away from the cylinder head and then back towards the cylinder head en route to the notch; and fastened to the cylinder head, a carrier clamp configured to substantially enclose the first part and provide sealing compression of the first part against the cylinder head.

2. The valve cover of claim 1, wherein the valve-cover body is able to move relative to the cylinder head, and wherein movement thereof is accommodated by flexibility in the slack region of the second part.

3. The valve cover of claim 1, wherein the second part is fixed along an endless, longitudinal edge of the first part.

4. The valve cover of claim 1, wherein the valve-cover body includes a notch configured to receive an end of the second part, the notch spaced horizontally from the first part in the direction consistently inboard the engine, but disposed over the cylinder head at substantially the same height as the first part.

5. The valve cover of claim 1, wherein the slack region of the second part includes a curved portion configured to flex to accommodate movement in horizontal and vertical directions.

6. The valve cover of claim 1, wherein the carrier clamp includes a web, the web having a curved contact surface configured to contact the second part.

7. A valve-cover gasket comprising:
a rounded, elongate first part configured to seal against a cylinder head of an engine due to sealing compression provided by a carrier clamp fastened to the cylinder head, the carrier clamp substantially enclosing the first part; and
a diaphragmatic second part to be received in a notch of a valve-cover body, the notch and the first part having substantially the same elevation relative to the cylinder head, the second part extending from the first part, toward the notch, in a direction consistently inboard the engine, the second part including a soft, flexible slack region to dampen noise from below the valve cover, the slack region statically curving up and away from the cylinder head and then back towards the cylinder head en route to the notch.

8. A valve cover for an engine, comprising:
a valve-cover body spaced apart from a cylinder head of the engine;
a valve cover gasket having a rounded, elongate first part configured for sealing compression against the cylinder head, and a diaphragmatic second part sealingly coupled to the first part and extending substantially horizontally from the first part in a direction inboard the engine to sealingly couple to the valve-cover body, the second part including a soft, flexible slack region to dampen noise from below the valve cover; and
a carrier clamp configured to substantially enclose the first part and provide the sealing compression of the first part against the cylinder head, the carrier clamp including a flange disposed substantially horizontally over the first part, with first and second webs disposed substantially vertically along opposite sides of the flange, the first web and the second web each extending above the flange away from the cylinder head.

9. The valve-cover gasket of claim 8, wherein the first web is located on an outboard side of the first part, and the second web is located on an inboard side of the first part, and wherein the second web includes a bottom edge disposed to contact the second part.

10. The valve-cover gasket of claim 7, wherein the second part is integrally formed with the first part.

11. The valve-cover gasket of claim 7, wherein the slack region includes a first curve and a second curve, the first and second curves having different curvature.

12. The valve-cover gasket of claim 7, wherein the slack region extends substantially horizontally in the direction consistently inboard the engine to an end that couples to the valve-cover body.

13. The valve-cover gasket of claim 9, wherein the slack region curves up and away from the cylinder head and then back towards the cylinder head en route to an end that couples to the valve-cover body.

* * * * *